United States Patent
Robinson et al.

(10) Patent No.: US 9,896,870 B2
(45) Date of Patent: Feb. 20, 2018

(54) ENCLOSURE HAVING RIBBED STANCHIONS

(71) Applicants: Joshua A. Robinson, Loveland, CO (US); Kirk A. Robinson, Loveland, CO (US)

(72) Inventors: Joshua A. Robinson, Loveland, CO (US); Kirk A. Robinson, Loveland, CO (US)

(73) Assignee: Gator Kennels LLC, Loveland, CO (US)

( * ) Notice: Subject to any disclaimer, the term of this patent is extended or adjusted under 35 U.S.C. 154(b) by 587 days.

(21) Appl. No.: 13/786,099

(22) Filed: Mar. 5, 2013

(65) Prior Publication Data

US 2013/0228732 A1     Sep. 5, 2013

Related U.S. Application Data

(60) Provisional application No. 61/606,550, filed on Mar. 5, 2012.

(51) Int. Cl.

| E05D 7/12 | (2006.01) |
|---|---|
| E04H 17/16 | (2006.01) |
| E04H 17/22 | (2006.01) |
| A01K 1/00 | (2006.01) |

(52) U.S. Cl.
CPC .............. *E05D 7/12* (2013.01); *A01K 1/0017* (2013.01); *E04H 17/168* (2013.01); *E04H 17/22* (2013.01); *E05D 2007/126* (2013.01); *E05Y 2900/40* (2013.01); *Y10T 292/0834* (2015.04); *Y10T 292/096* (2015.04); *Y10T 292/1022* (2015.04)

(58) Field of Classification Search
CPC .......... Y10T 292/096; E05D 2007/126; E05Y 2900/40; A01K 1/0017; E04H 17/168; E04H 17/22
USPC .... 25/24, 25, 65.14, 73, DIG. 5; 256/24, 25, 256/65.14, 73, DIG. 5; 52/239, 281, 52/282.1, 282.2, 762, 781, 843, 855, 52/586.1, 586.2; 312/326, 329
See application file for complete search history.

(56) References Cited

U.S. PATENT DOCUMENTS

| 124,502 | A | * | 3/1872 | McKnight | ............... | E04H 17/16 |
| | | | | | | 256/24 |
| 891,466 | A | * | 6/1908 | Dewey | .................. | B61D 17/06 |
| | | | | | | 105/411 |
| 1,517,119 | A | * | 11/1924 | Luhring | .............. | E04H 12/2215 |
| | | | | | | 256/57 |
| 2,167,525 | A | * | 7/1939 | Rosendale | ................ | E04H 1/14 |
| | | | | | | 220/668 |
| 3,087,768 | A | * | 4/1963 | Mack | ................. | A47B 47/0008 |
| | | | | | | 312/263 |

(Continued)

*Primary Examiner* — Abigail E Troy
(74) *Attorney, Agent, or Firm* — Samuel M. Freund; Cochran Freund & Young LLC (57) ABSTRACT

An enclosure having identical ribbed stanchions and panels, and a gate which may be pivotably hung from the stanchions such that it swings in either direction, and may be opened from either side, depending on the assembly of the enclosure, is described. This enables the enclosure to be assembled and disassembled without having to identify the supporting members and without having to purchase right- and left-handed gates. A latch which may be opened from both inside and outside of the enclosure is also described.

5 Claims, 11 Drawing Sheets

(56) References Cited

U.S. PATENT DOCUMENTS

| | | | | |
|---|---|---|---|---|
| 5,494,261 A * | 2/1996 | Gandara | ............... | E04H 17/166 256/24 |
| 6,213,452 B1 * | 4/2001 | Pettit | ................... | E04F 11/1812 248/188.8 |
| 6,430,885 B1 * | 8/2002 | Ito | ....................... | E04F 13/0812 52/235 |
| 7,686,283 B2 * | 3/2010 | Marchio | ................. | E06B 11/02 256/11 |
| 7,802,351 B2 * | 9/2010 | McGinness | ......... | E04H 12/2253 256/65.14 |
| 8,317,226 B1 * | 11/2012 | Wong | ...................... | G09F 17/00 280/769 |
| 8,517,481 B2 * | 8/2013 | Li | ........................ | H05K 5/0226 16/335 |
| 2003/0131445 A1 * | 7/2003 | Padiak | ................... | E05D 5/023 16/309 |
| 2012/0256149 A1 * | 10/2012 | Sylvester | ............. | E01F 13/028 256/73 |

* cited by examiner

ENCLOSURE HAVING RIBBED STANCHIONS

CROSS-REFERENCE TO RELATED APPLICATIONS

The present application claims the benefit of U.S. Provisional Patent Application No. 61/606,550 for "Enclosure Having Ribbed Stanchions" by Joshua A. Robinson et al., which was filed on Mar. 5, 2012, the entire content of which is hereby specifically incorporated by reference herein for all that it discloses and teaches.

FIELD OF THE INVENTION

The present invention relates generally to enclosures and, more particularly, to enclosures having ribbed stanchions.

BACKGROUND OF THE INVENTION

Animal enclosures are ubiquitous, and are available in many designs and sizes. Larger enclosures are often attached to the floor and are specifically designed to be employed in a particular setting, such as in a kennel, which generally restricts their ability to be reconfigured. As examples, kennel enclosures are often located against building walls or configured such that multiple enclosures are joined at their side walls, whereby fewer than four walls are required for each enclosure.

Additionally, stanchions or posts for enclosures are different for corners and inside locations, or may be round, both of which requires additional assembly and disassembly time if the enclosures are intended to be moved or erected for individual events such as stock shows. Round posts require alignment of the kennel elements during assembly.

Kennel gate latches are generally designed to open from the outside in order to prevent animals from escaping. However, such latches may capture attendants if the kennel entrance closes when the attendant is inside of the kennel. Further, many latch designs do not provide a gate which swings in both directions, and also permit assembly of the kennel such that the gate may be opened from either side.

SUMMARY OF THE INVENTION

Embodiments of the present invention overcome the disadvantages and limitations of prior art by providing an enclosure having self-aligning components.

Another object of embodiments of the invention is to provide an enclosure, wherein all posts are identical and there are no right-handed and left-handed components.

Yet another object of embodiments of the invention is to provide an enclosure having a gate which swings in either direction.

Still another object of embodiments of the invention is to provide an enclosure which swings in either direction and may be opened from either side.

Yet another object of embodiments of the invention is to provide an enclosure having a latch that may be opened both from the inside and the outside of the enclosure.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the enclosure hereof includes: at least one elongated rectangular stanchion having a first side, an opposing second side, a third side perpendicular to the first side, and an opposing fourth side, and a longitudinal rib protruding perpendicularly from at least one of the first side, the second side, the third side, and fourth side; and at least one panel member having a chosen thickness, a first side and a second side, the first side of the at least one panel member adapted to be attached to the rib of the at least one stanchion.

In another aspect of the present invention, and in accordance with its objects and purposes, the enclosure hereof includes: four elongated rectangular stanchions each having a first side, an opposing second side, a third side, and an opposing fourth side; and a longitudinal rib protruding from each of at least two of the first side, second side, third side, and fourth side of each of the stanchions; three panel members each having a chosen thickness, a first side, a second side, each of the three panel members being adapted to be attached to one rib of one of the four stanchions at the first side, and to one rib of another of the four stanchions at the second side thereof; a gate member having a first side and a second side, and pivotably attached to one rib of one of the four stanchions at the first side; and a latch for securing said gate member to one rib on one of the four stanchions attached to the second side of the gate member.

Benefits and advantages of embodiments of the present invention include, but are not limited to, providing an enclosure having self-aligning components which can readily be reconfigured, a gate which can swing at least 180° in either direction and permit opening the enclosure from either side, depending on the way the enclosure is assembled, and a latch which may be opened both from inside and outside of the enclosure.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 2D is a schematic representation of a perspective view of the attachment of an enclosure panel and the mounting of a gate panel pivotably mounted on eyebolt to perpendicular ribs of the post as illustrated in FIG. 2B, hereof.

DETAILED DESCRIPTION OF THE INVENTION

Briefly, embodiments of the present invention include an enclosure having identical ribbed stanchions, and a gate which may be pivotably hung from the stanchions such that it swings in either direction, and may be opened from either side, depending on the assembly of the enclosure. This enables the enclosure to be assembled and disassembled without having to identify the supporting members and without having to purchase right- and left-handed gates. Embodiments of the invention further include a latch which may be opened from both inside and outside of the enclosure.

As used herein, the terms "post" and "stanchion", "base" and "foot", and "eyelet" and "eyebolt" will be used interchangeably.

Figure 1A:
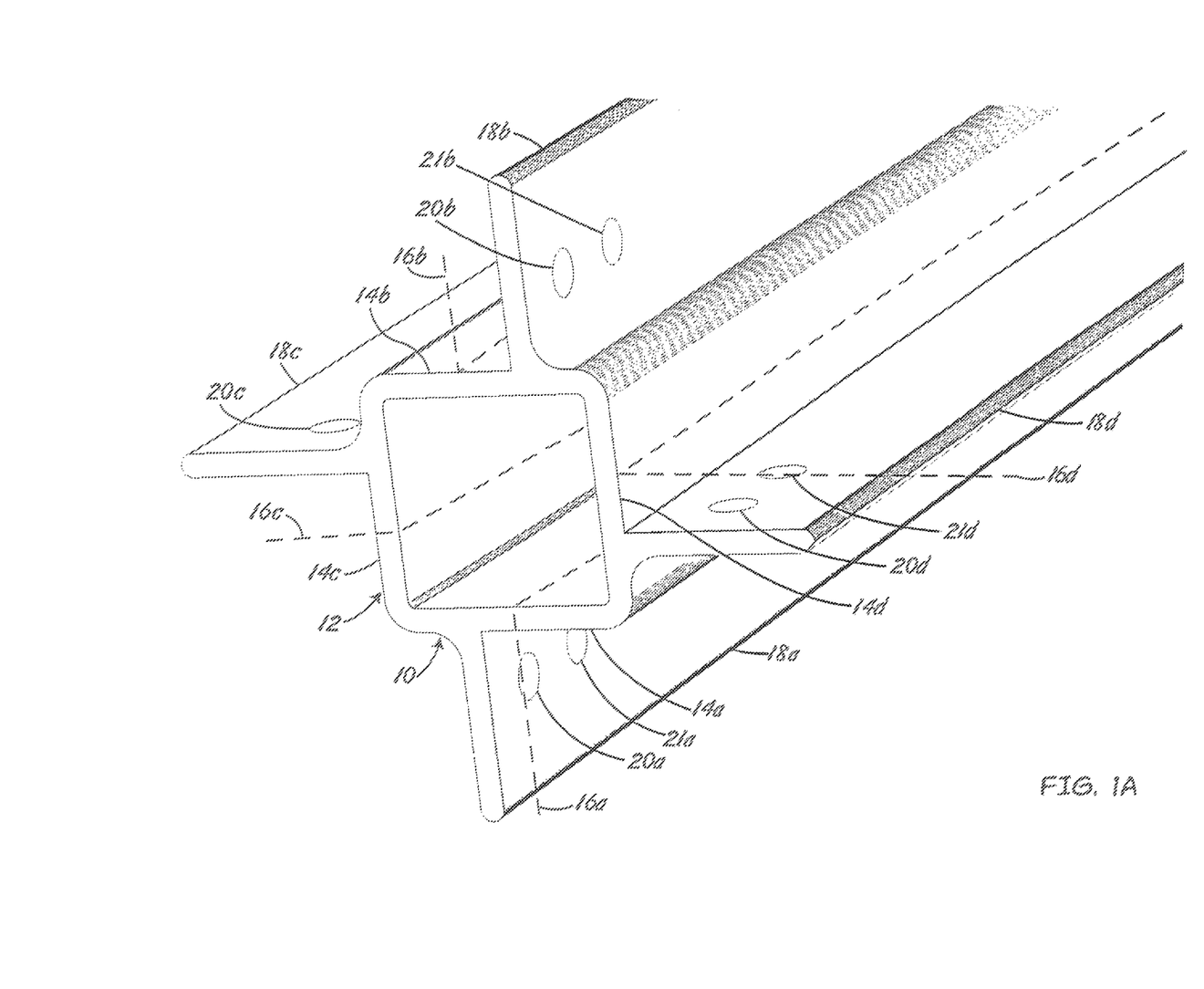
FIG. 1A is a schematic representation of a perspective view of an embodiment of the post of the present invention showing a central square tubular member having offset opposing ribs.

Reference will now be made in detail to the present embodiments of the invention, examples of which are illustrated in the accompanying drawings. In the FIGURES, similar structure will be identified using identical reference characters. It will be understood that the FIGURES are for the purpose of describing particular embodiments of the invention and are not intended to limit the invention thereto. Turning now to FIG. 1A, a schematic representation of a perspective view of an embodiment of post or stanchion, 10, of the present invention is illustrated, showing central member, 12, shown as a square tube, has face, 14a, opposing face, 14b, face, 14c, and opposing face, 14d, with centerlines, 16a-16d, respectively, and offset opposing ribs, 18a-18d, respectively. As will be described in more detail hereinbelow, the ribs may be offset a chosen amount from the centerlines of the faces from which they protrude in order that panels attached thereto for completing the enclosure are in line. A rib offset of ½ of the panel thickness for each opposing rib will accomplish this goal, although other offsets, including zero offset, may be employed to achieve other purposes. Post 10 may be made from aluminum, aluminum alloy, hard plastic, or other suitable materials. The aluminum and aluminum alloys may be anodized. Central member 12 may be rectangular in shape, and may be solid. Ribs 18a-18d may be welded to central member 12, or may be extruded (integrally formed) therewith. Holes, shown as, 21a, 21b, and 21d, hole 21c, not being shown in FIG. 1A, are placed in ribs 18a-18d for attaching other components of the enclosure, as will be described hereinbelow. Additionally, again depending on the intended application, ribs 18a-18d may not extend the entire length of the faces of central member 12, not shown in FIG. 1A.

Figure 1B:
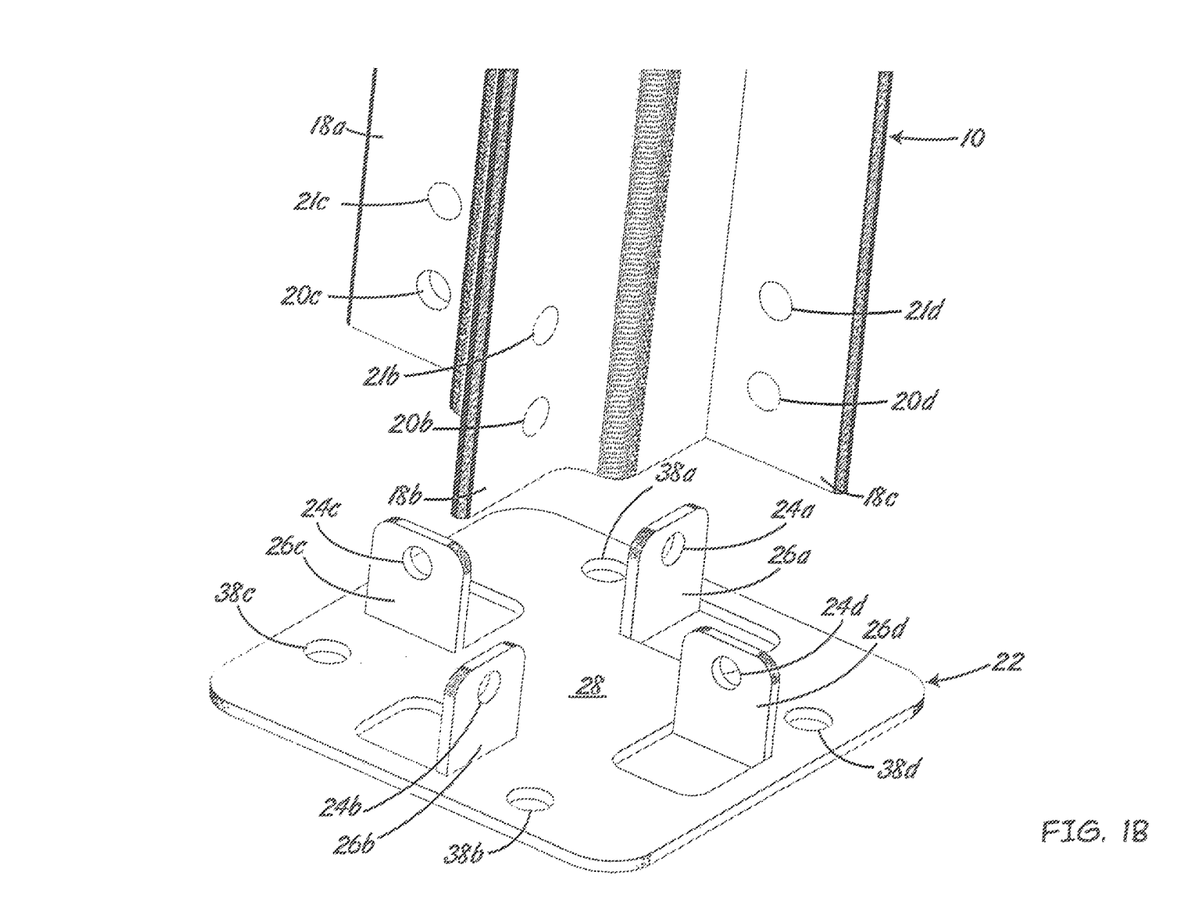
FIG. 1B is a schematic representation of a perspective view of an embodiment of a foot adapted for receiving the post illustrated in FIG. 1A hereof and affixing the foot to a surface.

FIG. 1B is a schematic representation of a perspective view of an embodiment of foot or base member, 22, adapted for receiving and fastening post 10 such that it is oriented perpendicular to a ground surface. Holes, 24a-24d, in angle brackets, 26a-26d, shown in FIG. 1B as being formed from base, 28, are adapted for receiving fastening devices, not shown in FIG. 1B which also pass through holes 20a-20d in post 10. Fastening devices may include screws and nuts, self-threading screws, rivets, and the like, depending on the application.

Figure 1C:
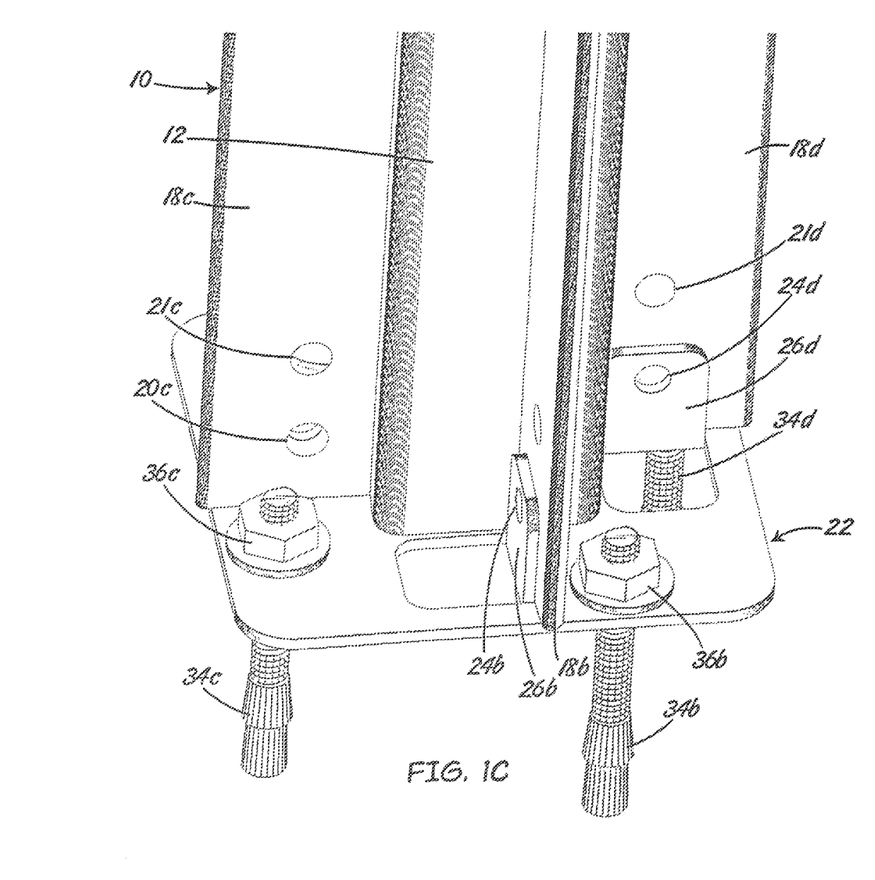
FIG. 1C is a schematic representation of the foot illustrated in FIG. 1B hereof being used to attach the post illustrated in FIG. 1A hereof to a ground surface.
Figures 1D, 1E, 1F:
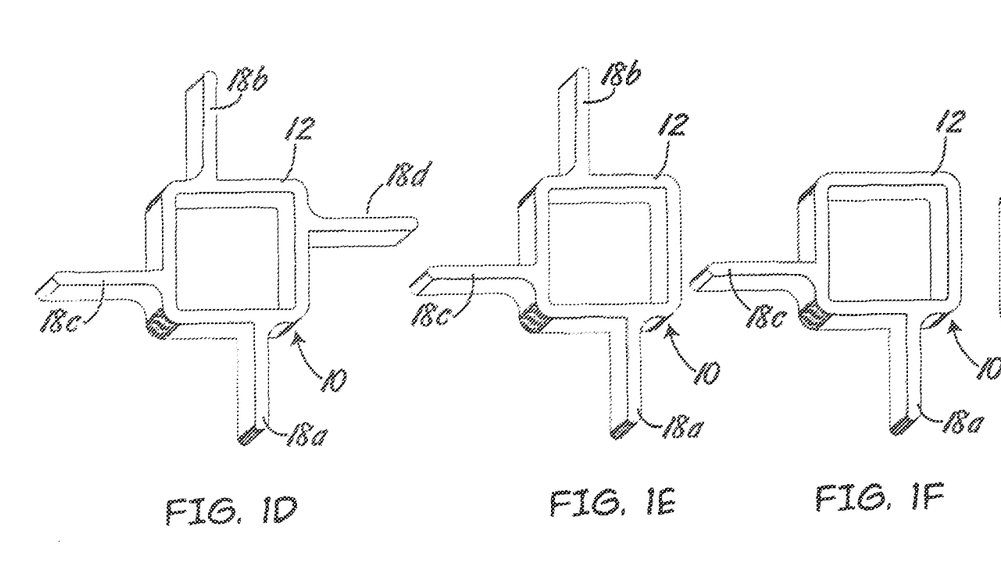
FIGS. 1D-1G show embodiments of the post of the present invention having ribs protruding from a reduced number of faces of the central member.
Figure 1G:
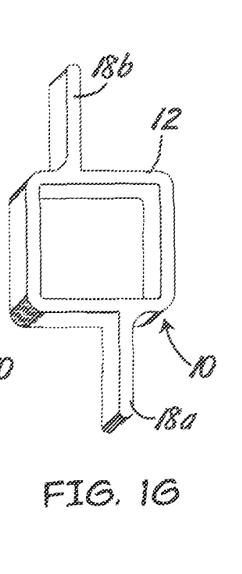

FIG. 1C is a schematic representation of foot 22 being used to attach post 10 to ground surface 32, using appropriate expansion bolts, shown as 34b-34d, bolt, 34a, not being shown in FIG. 1C, and nuts, shown as 36b and 36d, nuts 36a and 36d not being shown in FIG. 1C, through holes, 38a-38d (FIG. 1B), in base 28 of foot 22.

In some circumstances it may be beneficial to have ribs protruding from a reduced number of faces of central member 12; that is, from 2, or 3 faces, depending on the intended application, as illustrated in FIGS. 1D-1G hereof.

Figure 2A:
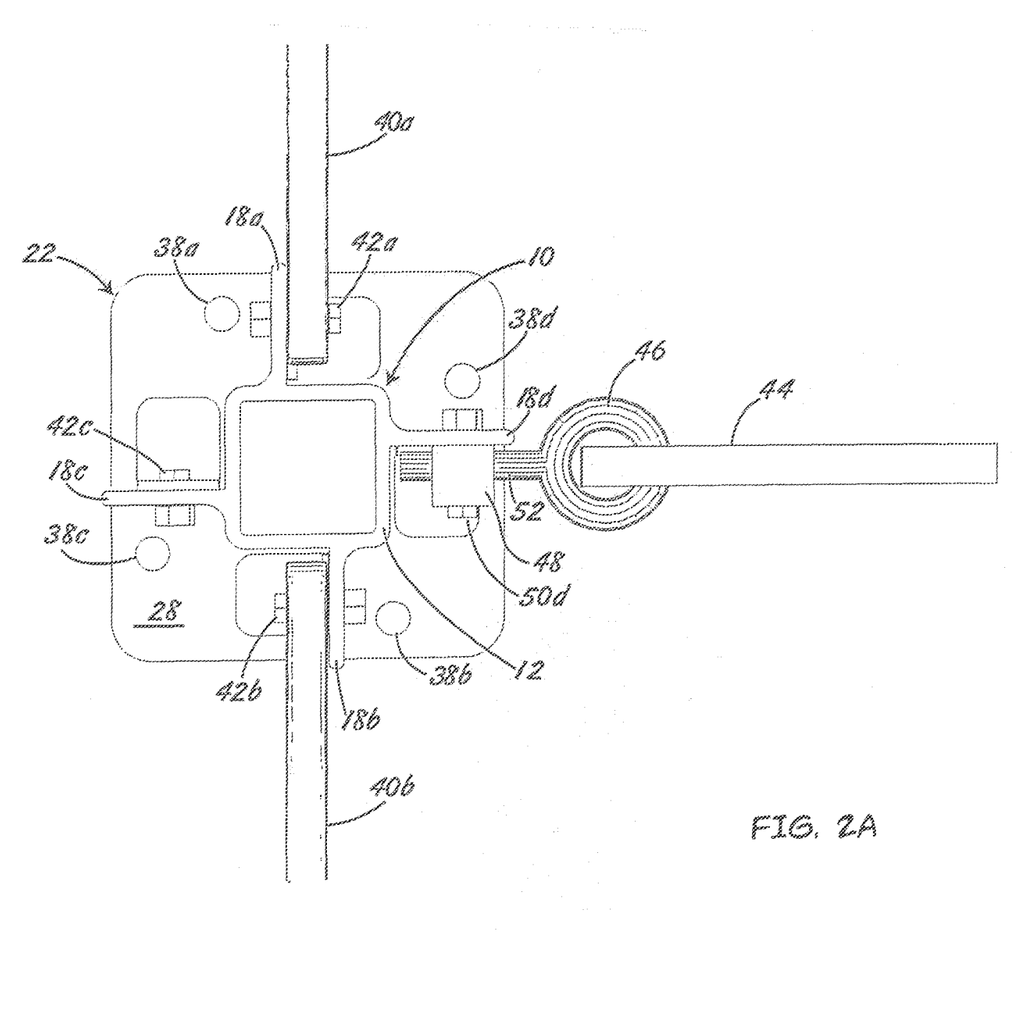
FIG. 2A is a schematic representation of a top view of the post and foot shown in FIGS. 1A and 1B, hereof, illustrating two in-line enclosure panels attached to opposing ribs of the post and a gate panel pivotably mounted on eyebolts mounted to a rectangular member attached to a perpendicular rib of the post.

FIG. 2A is a schematic representation of a top view of post 10 and foot 22 shown in FIGS. 1A-1C, hereof, illustrating two in-line enclosure panels, 40a, and 40b, to be described in more detail hereinbelow, attached to opposing ribs 18a and 18b of post 10 by bolts, 42a and 42b, and 42c, and 42d, respectively. Gate panel, 44, is shown pivotably mounted on eyelet, or eyebolt if a threaded or bolt portion is attached thereto, 46, attached to rectangular member, 48, shown attached to perpendicular rib 18d of post 10 by bolt 50d. Eyebolt 46 may be screwed into threaded holes in rectangular member 48 adapted to receive the threaded portion, 52, thereof (not shown in FIG. 2A), and using appropriate nuts and washers threaded onto eyebolt 46 (not shown in FIG. 2A), as an example. As illustrated, washers may be used where appropriate. Clearly, the number of bolts and eyelets or eyebolts and/or or other fasteners actually utilized will be determined by the weight of the parts being attached, the size of and the intended use of the enclosure, and other mechanical considerations well known in the art of enclosures. By bolting the panels to the posts, animals in one enclosure cannot view animals in an adjacent enclosure. Panels 40 and gates 44 may be formed from high density polyethylene, or other suitable materials. Eyelets or eyebolts 46 may be attached to ribs 18 in other ways as known in the art, such as welding, as an example.

Figure 2B:
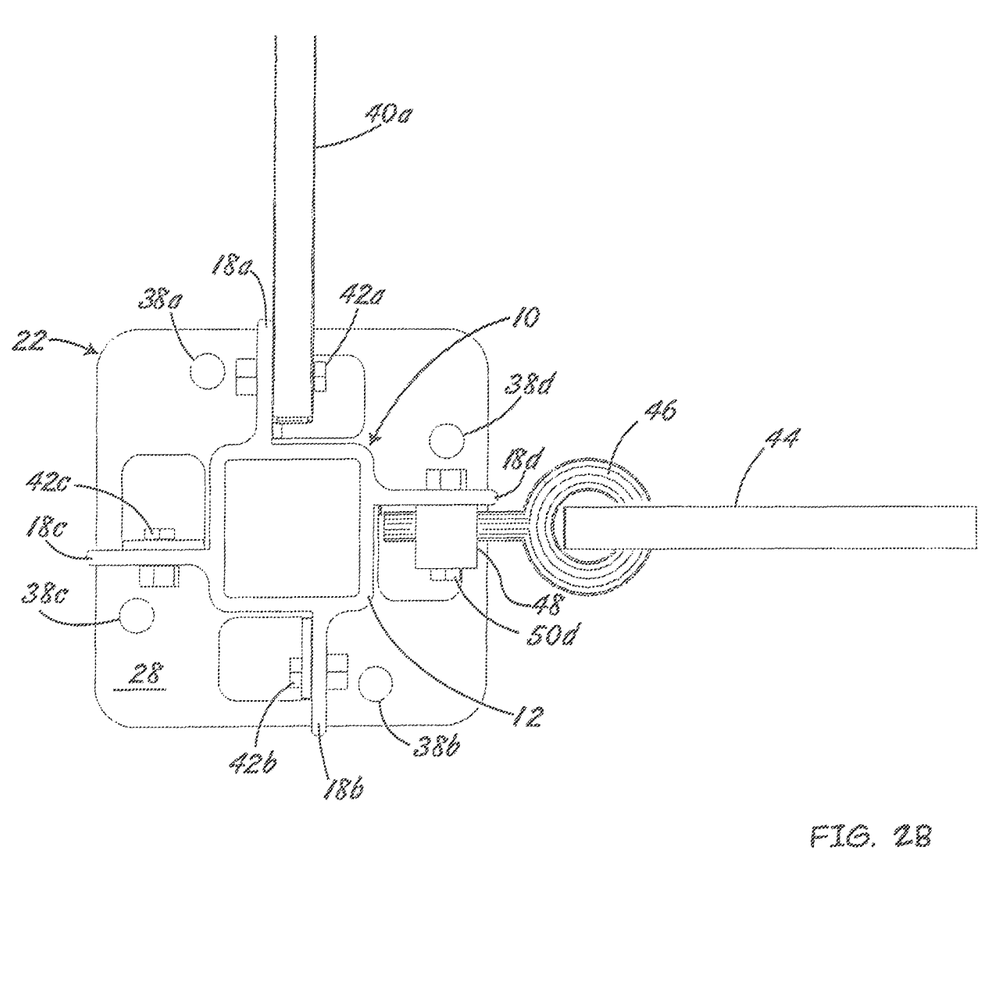
FIG. 2B is a schematic representation of a top view of the post and foot shown in FIGS. 1A and 1B, hereof, illustrating an enclosure panel attached to a rib of the post and a gate panel pivotably mounted on eyebolts mounted to a rectangular member attached to a perpendicular rib of the post.

FIG. 2B is a schematic representation of a perspective view of post 10 and foot 22 illustrating enclosure panel 40a attached to rib 18a of post 10 and gate panel 44 pivotably mounted to rectangular member 48 attached to perpendicular rib 18d of post 10. Clearly, many such configurations are possible, depending on the intended use of the enclosure and whether multiple enclosures are to be joined together.

Figure 2C:
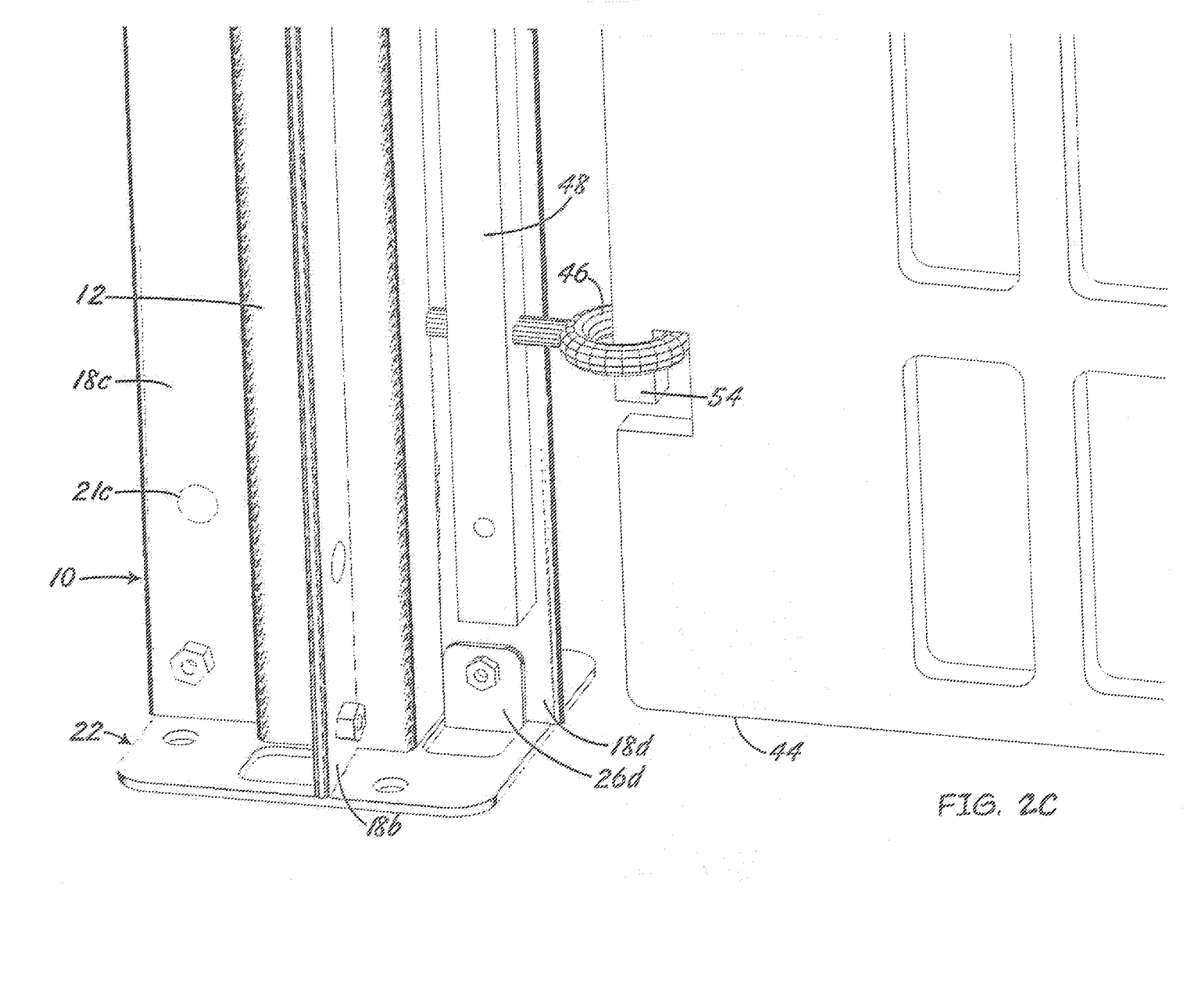
FIG. 2C is a schematic representation of a side view of the gate panel illustrated in FIG. 2B hereof.

FIG. 2C is a schematic representation of a side view of gate panel 44 shown pivotably attached to eyebolt 46 by pin 54 integrally formed in gate 44, or otherwise attached thereto. Clearly, at least two eyebolt/hinge pin combinations are required to permit gate panel 44 to swing smoothly, as shown in FIG. 2D, hereinbelow, while only one combination might be necessary to support a lightweight bar. When used as a pivot, pin 54 performs as a hinge pin. However, pins 54 may be formed along the edges of panels 40, and together with corresponding eyelets or eyebolts, can be used to "hang" panels 40 onto the rib or ribs 18 of posts 10 as a means of attachment thereto.

FIG. 2D is a schematic representation of a perspective view of the attachment of enclosure panel 40 and the pivotable mounting of gate panel 44 to perpendicular ribs of post 10 as illustrated in FIG. 2B, hereof. Since gate panel 44 may be constructed from hard plastic material, there are no metal-on-metal parts that will squeak or require lubrication over time.

Figure 2E:
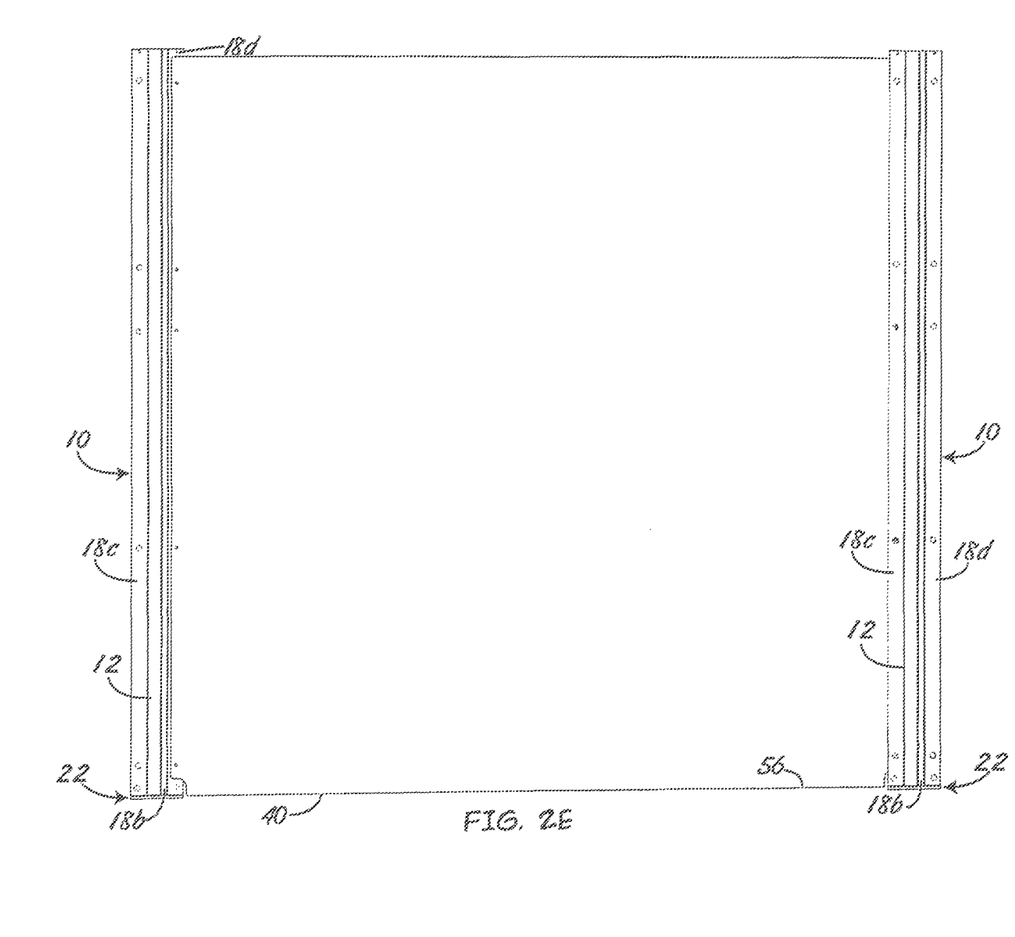
FIG. 2E is a schematic representation of a side view of an enclosure panel attached at each end to a post shown in FIG. 1A, hereof.

FIG. 2E is a schematic representation of a side view of enclosure panel 40 attached at each end to a post 10 using several bolts. In some configurations, panel 40 may be attached directly to a wall such that only one end thereof would be attached to a post. Panels 40 may be sealed to a concrete floor by utilizing rubber gaskets inserted on bottom edge, 56, thereof (not shown in FIG. 2E).

Figure 3A:
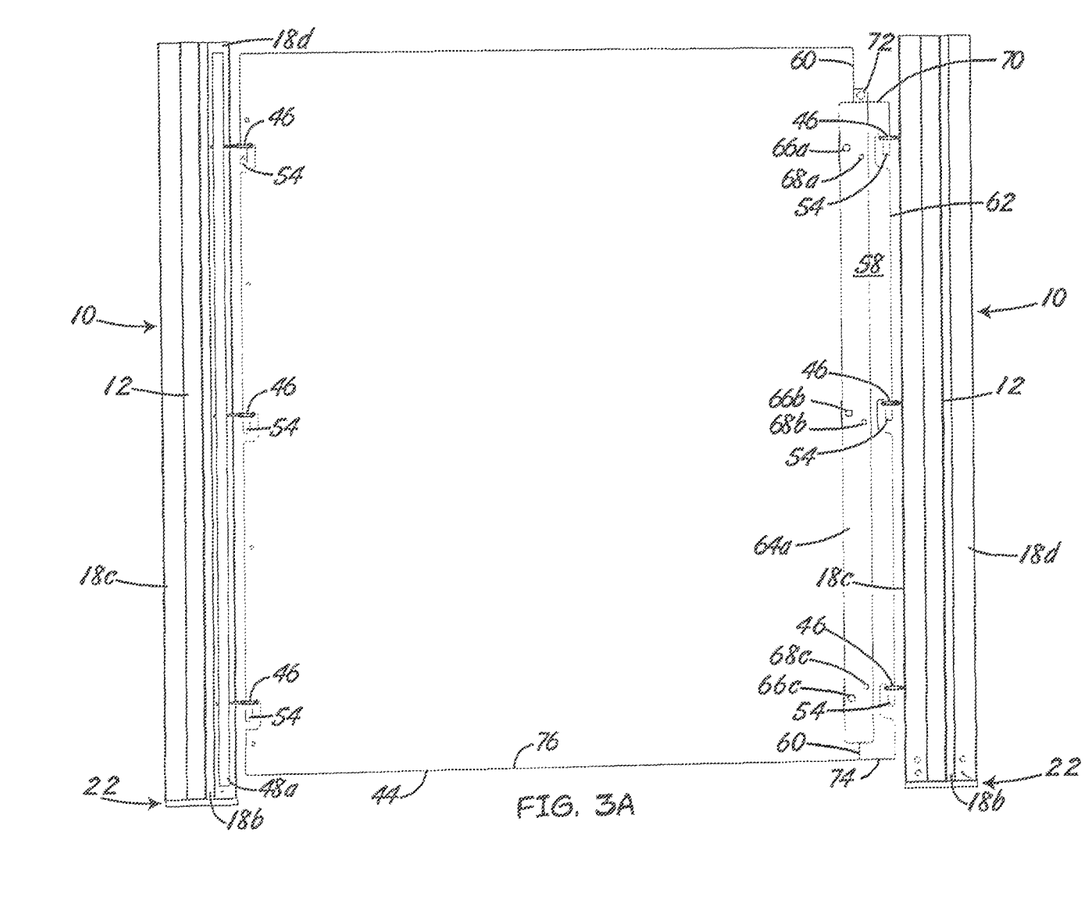
FIG. 3A is a schematic representation of a side view of the swinging gate mounted to a rectangular member on one side thereof, as illustrated in FIG. 2C, hereof, the other side of the gate being mounted by a latching device to a second rectangular member, both rectangular members being attached to adjacent posts or walls.

FIG. 3A is a schematic representation of a side view of swinging gate panel 44 pivotably mounted to rectangular member 48a on one side thereof by hinge pins 54, integrally formed in the gate adapted to fit into eyebolts 46, as illustrated in FIG. 2C, hereof. Latching device, 58, is slidably attached to the other side, 60, of gate panel 44. Elongated slide, 62, which may be formed from the same material as gate panel 44, has longitudinal channels therethrough (not shown in FIG. 3A), and hinge pins 54 integrally formed therein or otherwise attached thereto, which are adapted to slide into and out of eyebolts 46 mounted in an identical opposing rectangular member 48b to that of 48a on the other side of gate panel 44, depending on the position of slide 62. Both rectangular members 48a and 48b are attached to adjacent posts, or to a post and a wall, if the enclosure is mounted adjacent to a wall. Slide 62 is slidably mounted on gate panel 44 by first elongated flat panel, 64a, and opposing, second elongated flat panel, 64b, disposed on the opposite side of gate panel 44 (shown in FIG. 3B). First and second flat panels 64a and 64b sandwich gate panel 44, and are secured thereto using bolts, 66a-66c. Shoulder bolts, 68a-68c, between flat panels 64a-64c are adapted to pass through the longitudinal channels through slide 62. Together, panels 64a and 64b permit slide 62 to be vertically moved in a downward direction along outside edge 60 of gate 44 by the action of gravity and/or by an attendant pushing down on top portion, 70, of slide 62, or in an upward direction by an attendant pulling in an upward direction on top portion 70 of slide 62. Gate panel 44 is latched to or unlatched from rectangular member 48 by the action of hinge pins 54 in slide 62 engaging or disengaging eyebolts 46, respectively. Extension, 70, on the uppermost edge of flat panel 64b has hole, 72, formed therein or attached thereto. Gate panel 44, may be locked in its closed position by inserting a bolt or lock in hole 72, which prevents slide 62 from being moved in an upward direction. Gate panel 44 may be opened from the other side by simply installing the gate such that latching device 58 is facing eyebolts 46 mounted in rectangular member 48a. As stated hereinabove, gate panel 44 is capable of swing at least 180° in eyebolts 46. Slide 62 and gate panel 44 may be disposed such that the bottom edges thereof, 74, and 76, respectively, are close to the ground, thereby preventing small animals from escaping.

Figure 3B:
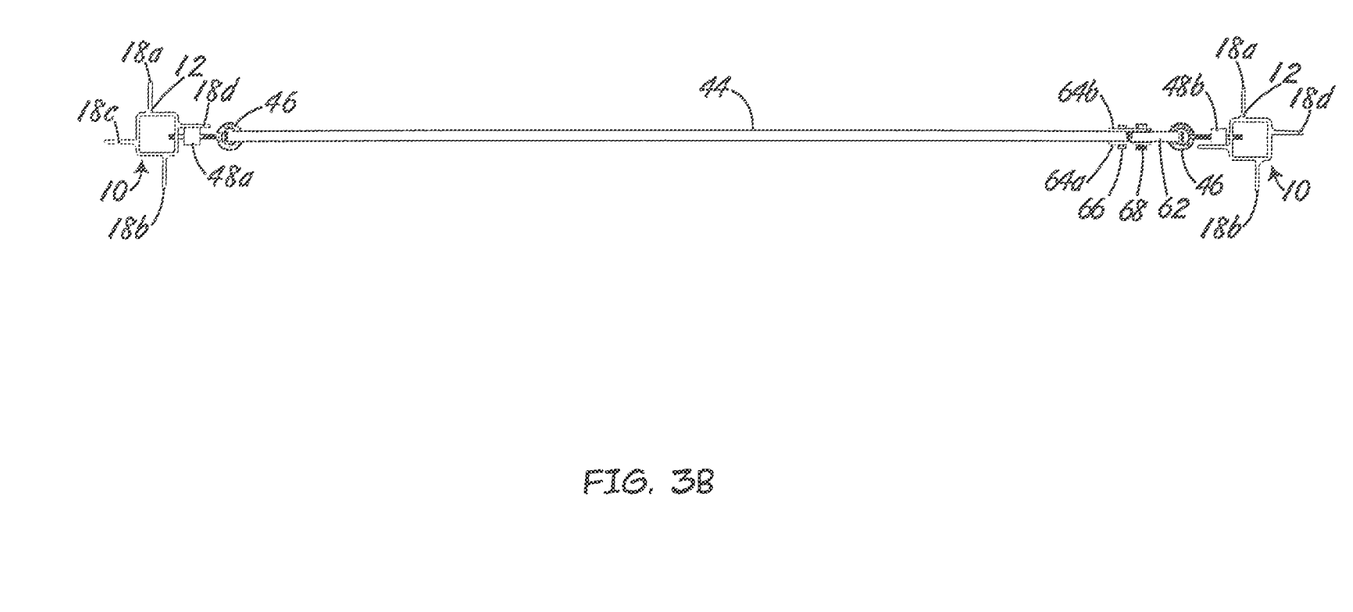
FIG. 3B is a schematic representation of a top view of the swinging gate as illustrated in FIG. 3A, hereof.

FIG. 3B is a schematic representation of a top view of the swinging gate as illustrated in FIG. 3A, hereof.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An enclosure comprising: at least two elongated rectangular stanchions each having a length, a first side, an opposing second side, a third side, and an opposing fourth side; and at least one longitudinal rib having the same length as said at least two elongated rectangular stanchions, and said at least one longitudinal rib protruding from each of at least two of the first side, second side, third side, and fourth side of each of said at least two stanchions; at least one panel member each of which at least one panel member having a chosen thickness, a first side and a second side, each of said at least one panel member adapted to be attached to one of said at least one longitudinal rib of one of said at least two stanchions on the first side, and to one of said at least one longitudinal rib of another of said at least two stanchions at the second side thereof; a gate member having a first side and a second side, and pivotably attached to one rib of said at least one longitudinal rib of one of the at least two stanchions at the first side; a latch for securing said gate member to one rib of said at least one longitudinal rib on one of said at least two stanchions attached to the second side of said gate member; and at least one first eyelet fastened to one longitudinal rib of at least two ribs of one stanchion of said at least two stanchions to which said gate member is pivotably attached; said gate member further comprising at least one first pin disposed along the first side thereof, wherein said at least one first pin is adapted to slide into said first eyelet.

2. The enclosure of claim 1, wherein each of said at least two stanchions comprises a square stanchion.

3. The enclosure of claim 1, further comprising at least two base members capable of being fastened to a ground surface for attaching each of the at least two stanchions to the ground surface and for orienting each of said at least two stanchions vertically to the ground surface.

4. The enclosure of claim 1, wherein each of the first side, the second side, the third side and the fourth side of each of said at least two stanchions has a longitudinal centerline, wherein each rib of said at least one longitudinal rib is disposed along the longitudinal centerline of the side from which the rib protrudes.

5. The enclosure of claim 1, wherein the at least one first pin and the at least one second pin are integrally formed in said gate member.

* * * * *